P. WINEMAN.

PUMP.

No. 7,006. Reissued March 21, 1876.

WITNESSES

A. McCallum

S. G. Allen

By

INVENTOR

Parker Wineman

Attorney

N. PETERS, PHOTO-LITHOGRAPHER, WASHINGTON, D. C.

UNITED STATES PATENT OFFICE

PARKER WINEMAN, OF JOLIET, ILLINOIS.

IMPROVEMENT IN PUMPS.

Specification forming part of Letters Patent No. 90,143, dated May 18, 1869; reissue No. 7,006, dated March 21, 1876; application filed September 21, 1874.

*To all whom it may concern:*

Be it known that I, PARKER WINEMAN, of Joliet, in the county of Will and State of Illinois, have invented a new and Improved Pump; and I do hereby declare that the following is a full, clear, and exact description thereof, reference being had to the accompanying drawings, making part of this specification, in which—

Figure 1:
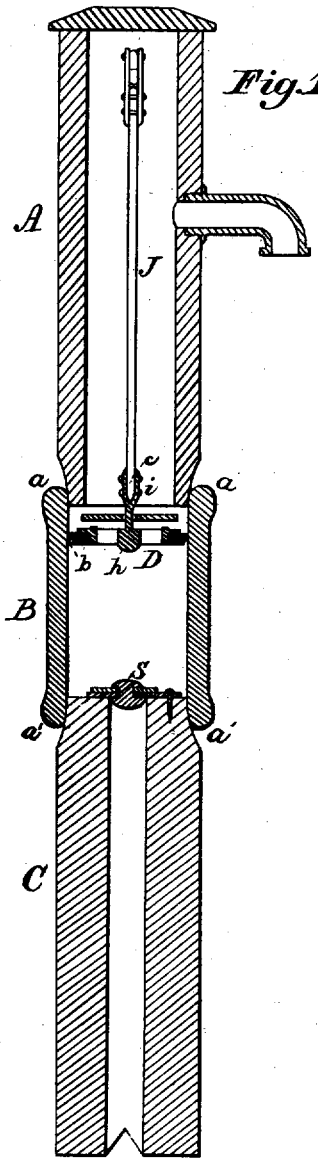
Figure 2:
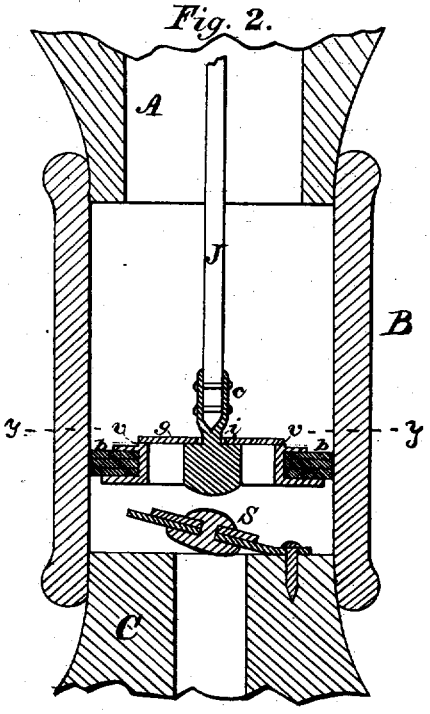
Figure 3:
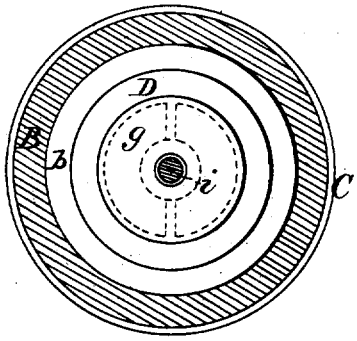

Figure 1 is a vertical central section through my improved pump, showing the piston or bucket in the act of descending. Fig. 2 is an enlarged central section through the metallic section and portions of the wooden section of the pump, showing the bucket or piston in the act of ascending. Fig. 3 is a section taken through the pump in the horizontal plane indicated by line *y y*, Fig. 2.

Similar letters of reference indicate corresponding parts in the several figures.

This invention relates to certain novel improvements in pumps; and consists, first, in constructing one of the sections or lengths of the pump-stock of metal, lined with a vitreous enamel, to present a smooth, durable surface to the pump-bucket or piston-packing, and adapted to connect with the ends of wooden sections without the use of bolts or screws, and thus serve as a coupling for these sections, as will be hereinafter explained. It also consists in an annularly-grooved ring-piston, which has confined within its groove a suitable packing, and which is constructed with an annular valve-seat on its upper side, adapted for a circular valve, which moves freely upon a central valve-stem, as will be hereinafter explained.

To enable others skilled in the art to understand my invention, I will describe its construction and operation.

In the accompanying drawings, A B C represent three hollow sections, which constitute the pen-stock of the pump: A is the upper section or body of the pump; B, metallic section, and C a foot-stock or bottom section. The metallic section B connects the wooden section A C without bolts or screws being used, the parts being united by frictional contact alone.

The section B is lined upon its inner side with a vitreous substance or enamel, applied in the usual well-known manner of enameling metallic surfaces, which will present a smooth surface to the piston-packing that will last for years without requiring a renewal. Not only will a smooth, durable surface be afforded in this way; but it will be seen that the piston will not be caused to bind and work tight in the metallic section—a difficulty often experienced in wooden pumps, owing to the contraction of the wood.

I am aware that it is not new to line or inclose within a pump-stock a vitreous substance, to prevent undue wear upon the piston-packing; but I am not aware that such feature has ever been employed in combination with a metallic section, which is adapted to connect with and unite the wooden sections of the pump-stocks without the use of bolts, screws, or other fastening device.

The piston consists of a ring, D, having a packing, *b*, of india-rubber or other suitable material, confined in a groove made in its circumference, and an annular rib or raised valve-seat, *v*, formed upon its upper side. A bridge, *h*, extends diametrically across the opening through the ring D, and from the center of this bridge rises a short piston-rod, *i*, having its upper end forked, as at *c*, for receiving and having secured to it the rod J, by which the piston is moved up and down.

The stem or valve-rod *i* receives loosely upon it a circular flat-faced valve, *g*, which is allowed to rise and fall freely, and which will, by fitting snugly upon its seat *v*, prevent water from passing through the piston during its ascent.

The enlargement of rod *i*, produced by the forked portion *c*, will prevent valve *g* from rising too high during the descent of the piston.

The piston-ring, its valve, and the stem or rod *i* are prevented from rusting by having these parts galvanized.

The packing *b*, if of india-rubber, is drawn over one of the flanges of the piston-ring, and allowed to contract and fill the groove formed in the periphery of this ring.

The valve *s*, which is applied to the upper end of section C, may be made in the usual well-known manner for preventing the fall of the water lifted into section B.

Having thus described my invention, what I claim as new, and desire to secure by Letters Patent, is—

1. The metal section B, lined with a vitreous substance, and formed so as to connect the wooden sections A and C by frictional contact, without the use of bolts, screws, or other fastening device, substantially as set forth.

2. The metal tube-section or working-barrel B, coated with a vitreous substance and constructed with flaring ends, and receiving into said ends the lower terminus of the section A, and the upper terminus of the lower section B, all substantially as described.

3. An annular-grooved ring-piston, D, constructed with a raised valve-seat, *v*, and a forked stem, *i c*, in combination with valve *g*, substantially as described.

PARKER WINEMAN.

Witnesses:

N. J. SMITH,

JOHN L. WILSON.